(12) United States Patent
Searcy et al.

(10) Patent No.: US 11,381,314 B2
(45) Date of Patent: Jul. 5, 2022

(54) FREE SPACE OPTICAL COMMUNICATION SYSTEMS AND METHODS FOR QOS CONTROL

(71) Applicant: BridgeComm, Inc., Denver, CO (US)

(72) Inventors: Paul Searcy, Niwot, CO (US); Barry Matsumori, Rolling Hills Estates, CA (US)

(73) Assignee: BridgeComm, Inc., Denver, CO (US)

( * ) Notice: Subject to any disclaimer, the term of this patent is extended or adjusted under 35 U.S.C. 154(b) by 0 days.

(21) Appl. No.: 17/193,464

(22) Filed: Mar. 5, 2021

(65) Prior Publication Data

US 2021/0314066 A1    Oct. 7, 2021

Related U.S. Application Data

(63) Continuation-in-part of application No. 16/258,117, filed on Jan. 25, 2019.
(Continued)

(51) Int. Cl.
*H04B 10/40* (2013.01)
*H04B 10/532* (2013.01)
(Continued)

(52) U.S. Cl.
CPC .......... *H04B 10/40* (2013.01); *G02B 27/285* (2013.01); *G02B 27/286* (2013.01);
(Continued)

(58) Field of Classification Search
CPC .. G02B 27/285; G02B 27/286; G02B 6/4249; H04B 10/40; H04B 10/506; H04B 10/532
(Continued)

(56) References Cited

U.S. PATENT DOCUMENTS

| 4,134,007 A | 1/1979 | Koreicho et al. |
| 6,504,634 B1 * | 1/2003 | Chan ................ H04B 10/1125 398/129 |

(Continued)

OTHER PUBLICATIONS

Nguyen et al; Development of a pointing, acquisition, and tracking system for cubeSat optical communication module; 2015; SPIE vol. 9351; p. 1-10 (Year: 2015).*

(Continued)

*Primary Examiner* — Amritbir K Sandhu
(74) *Attorney, Agent, or Firm* — Patents Integrated

(57) ABSTRACT

A method for communicating from a transceiver including a sub-transceiver array includes setting the sub-transceiver array to emit an optical signal at an initial pointing angle, and modifying at least one of the sub-transceivers to emit a first optical sub-signal at a first pointing angle having a first offset from the initial pointing angle. The method further includes, during a first transmit period, transmitting to a receiving transceiver from the sub-transceiver array a first optical signal including the first optical sub-signal, at a first data rate. The method also includes further modifying the sub-transceiver to emit a second optical sub-signal at a second pointing angle having a second offset from the initial pointing angle, the second offset being smaller than the first offset, and, in a second transmit period, transmitting to the receiving transceiver from the sub-transceiver array a second optical signal including the second optical sub-signal.

11 Claims, 10 Drawing Sheets

Related U.S. Application Data

(60) Provisional application No. 62/985,437, filed on Mar. 5, 2020, provisional application No. 62/712,203, filed on Jul. 30, 2018, provisional application No. 62/636,175, filed on Feb. 28, 2018, provisional application No. 62/622,140, filed on Jan. 26, 2018, provisional application No. 62/622,136, filed on Jan. 26, 2018.

(51) Int. Cl.
  *G02B 27/28* (2006.01)
  *H04B 10/50* (2013.01)
  *G02B 6/42* (2006.01)

(52) U.S. Cl.
  CPC ......... *H04B 10/506* (2013.01); *H04B 10/532* (2013.01); *G02B 6/4249* (2013.01)

(58) Field of Classification Search
  USPC .................................................. 398/135–140
  See application file for complete search history.

(56) References Cited

U.S. PATENT DOCUMENTS

| | | | |
|---|---|---|---|
| 6,650,451 | B1 | 11/2003 | Byers et al. |
| 6,856,459 | B1* | 2/2005 | Islam .................. G02B 6/2773 |
| | | | 250/227.12 |
| 8,301,027 | B2 | 10/2012 | Shaw et al. |
| 9,723,386 | B1* | 8/2017 | Ni ..................... H04B 7/18513 |
| 10,090,959 | B2 | 10/2018 | Lambert |
| 10,707,966 | B2* | 7/2020 | Velazco ............. H04B 10/1129 |
| 11,082,128 | B1* | 8/2021 | Dickson ............. H04B 10/1143 |
| 2001/0043379 | A1 | 11/2001 | Bloom et al. |
| 2001/0043381 | A1 | 11/2001 | Green et al. |
| 2002/0012139 | A1 | 1/2002 | Willebrand et al. |
| 2004/0033078 | A1 | 2/2004 | Kube et al. |
| 2004/0141753 | A1* | 7/2004 | Andreu-von Euw ...................... |
| | | | H04B 10/1127 |
| | | | 398/122 |
| 2007/0177880 | A1 | 8/2007 | Karasikov et al. |
| 2007/0242958 | A1 | 10/2007 | Ieda |
| 2009/0202254 | A1 | 8/2009 | Majumdar et al. |
| 2013/0315604 | A1 | 11/2013 | LoPresti et al. |
| 2014/0294399 | A1 | 10/2014 | Makowski et al. |
| 2014/0376914 | A1 | 12/2014 | Miniscalco |
| 2015/0349881 | A1* | 12/2015 | Byers ............... H04B 10/07955 |
| | | | 398/118 |
| 2016/0204866 | A1 | 7/2016 | Boroson et al. |
| 2016/0204899 | A1* | 7/2016 | Kojima ............ H04B 10/07953 |
| | | | 714/776 |
| 2016/0226584 | A1 | 8/2016 | Chalfant, III |
| 2016/0329961 | A1* | 11/2016 | Li ..................... H04B 10/1129 |
| 2018/0026721 | A1 | 1/2018 | Bock et al. |
| 2018/0041279 | A1* | 2/2018 | Segura ............. H04B 10/25891 |
| 2019/0229805 | A1* | 7/2019 | Velazco ............... H04B 10/112 |
| 2019/0326984 | A1 | 10/2019 | Ulander et al. |
| 2020/0186258 | A1* | 6/2020 | Brown ....................... G01J 9/04 |
| 2020/0225559 | A1 | 7/2020 | Stone |
| 2020/0343973 | A1* | 10/2020 | Geisler ................ H04B 10/112 |

OTHER PUBLICATIONS

Geisler et al; Demonstration of a variable data rate free-space optical communication architecture using efficient coherent techniques; 2016; Journal of Micro/Nanolithography, MEMS and MOEMS; pp. 1-13. (Year: 2016).*

Kaymak et al; A Survey on Acquisition, Tracking, and Pointing Mechanisms for Mobile Free-Space Optical Communications; 2018; IEEE; pp. 1-20. (Year: 2018).*

International Search Report and Written Opinion, PCT/US21/21001, dated Jun. 23, 2021.

USPTO Final Office Action; U.S. Appl. No. 16/258,117; dated Apr. 27, 2022.

* cited by examiner

FREE SPACE OPTICAL COMMUNICATION SYSTEMS AND METHODS FOR QOS CONTROL

PRIORITY CLAIM

The present application claims priority to U.S. Provisional Patent Application 62/985,437 (filed Mar. 5, 2020) entitled "Free Space Optical Communication Systems and Methods for QOS Control. The present application is also a Continuation-In-Part of copending U.S. patent application Ser. No. 16/258,117, filed Jan. 25, 2019 and entitled "Laser Communication Apparatus and Associated Methods," which in turn claims benefit of U.S. Provisional Patent Applications 62/622,136 (filed Jan. 26, 2018), 62/622,140 (filed Jan. 26, 2018), 62/636,175 (filed Feb. 28, 2018), and 62/712,203 (filed Jul. 30, 2018). All of the aforementioned applications are incorporated herein by reference in their entirety.

FIELD OF THE INVENTION

The present invention relates to laser communications and, more particularly, to free space optical communication systems.

BACKGROUND OF THE INVENTION

Current communication systems rely on the use of radio frequencies (RF) for the data downlink from Low Earth Orbit (LEO) small satellite (SmallSat). Communication channels between different Geostationary Equatorial Orbit (GEO) satellites, between a GEO satellite and LEO satellites, between a GEO satellite and a ground station, mobile user on an aircraft or submarine, or an unmanned autonomous vehicle (UAV) are currently possible. Aircraft to aircraft applications, as well as other communications scenarios, such as air-to-air, air-to-ground, ground-to-air, vehicle-to-vehicle, and others, are also requiring higher bandwidths along with dynamically tracking and transferring data between fast moving communication nodes. However, there are limitations to the data rates and data capacity of RF SmallSats due to the frequency range and mechanical limitations of the current systems.

In addition, the transceivers and ground stations of current systems require gimbals and other large mechanical means for physically scanning the field of view of the devices through a range of angles in order to be able to capture signal over those angles. This requirement is due to the fact that the currently available transceivers include a single aperture telescope for capturing and transmitting data signals between them. Such mechanical implementations are impractical or even detrimental for physical space and weight constrained applications such as on airplanes and UAVs.

Free space optical (FSO) systems generally provide lower probability of detection and higher jamming resistance than RF systems. However, when used in the atmosphere, FSO systems are susceptible to blockage by clouds, fog, and other obstructions, and FSO systems can suffer from deep fades even in clear atmosphere due to turbulence. In addition, where FSO systems are implemented with moving terminals, e.g., those mounted on airplanes or UAVs is that agile acquisition systems are needed to quickly acquire and continuously track the intended moving terminal. There is difficulty in rapidly moving and accurately positioning optical components to effectively acquire and track moving objects. Some other problems are a lack of continuous window area to provide an adequate field of regard with enough optical gain, the existence of single-point failure modes from debris or physical damage; and the susceptibility to performance degradation from environmental effects such as turbulence and scintillation.

SUMMARY OF THE INVENTION

In accordance with embodiments described herein, an optical communication transceiver is configured for free space communication between a satellite, ground station, or a flying object. The transceiver includes multiple sub-transceivers for transmitting and receiving signal over a plurality of angles, and quickly acquiring a receiver and maintaining a link with the receiver while reconfiguring sub-transceivers so that the optical signals maximize link margin and provide higher data rates than otherwise possible. Such an arrangement of multiple sub-transceivers thus controlled is referred to as a Managed Optical Communication Array (MOCA), which is distinct from a single aperture free space optical communication device, such as a conventional telescope.

In an embodiment, a method for initiating communication from an optical communications transceiver for use in free space communication is disclosed. The optical communication transceiver includes a plurality of sub-transceivers forming a sub-transceiver array, each one of the plurality of sub-transceivers within the sub-transceiver array being capable of transmitting optical signals at over a range of pointing angles and data rates. The method includes setting the sub-transceiver array to emit an optical signal at an initial pointing angle, and modifying at least one of the plurality of sub-transceivers in the sub-transceiver array to emit a first optical sub-signal at a first pointing angle having a first offset from the initial pointing angle. The method further includes, during a first transmit period, transmitting to a receiving transceiver from the sub-transceiver array a first optical signal, the first optical signal including the first optical sub-signal, at a first data rate. The method also includes further modifying the at least one of the plurality of sub-transceivers in the sub-transceiver array to emit a second optical sub-signal at a second pointing angle having a second offset from the initial pointing angle, the second offset being smaller than the first offset. The method further includes, in a second transmit period, following the first transmit period, transmitting to the receiving transceiver from the sub-transceiver array a second optical signal, the second optical signal including the second optical sub-signal.

In another embodiment, a method for initiating communication from an optical communications transceiver for use in free space communication is disclosed. The optical communication transceiver including a plurality of sub-transceivers forming a sub-transceiver array, each one of the plurality of sub-transceivers within the sub-transceiver array being capable of transmitting optical signals over a range of pointing angles, wavelengths, pulse delays, polarizations, timing offsets, phases, and data rates. The method includes setting the sub-transceiver array to emit an optical signal at an initial setting for pointing angle, wavelength, pulse delay, polarization, timing offset, phase, and data rate. The method further includes modifying at least one of the plurality of sub-transceivers in the sub-transceiver array to emit a first optical sub-signal at a first setting for pointing angle, wavelength, pulse delay, polarization, timing offset, phase, and data rate, the first setting being different from the initial setting. The method still further includes, during a first transmit period, transmitting to a receiving transceiver a first optical signal, the first optical signal including the first optical sub-signal, then further modifying the at least one of the plurality of sub-transceivers in the sub-transceiver array to emit a second optical sub-signal at a second setting for pointing angle, wavelength, pulse delay, polarization, timing offset, phase, and data rate, the second setting being different from the first setting. The method yet further includes, in a second transmit period, transmitting to the receiving transceiver a second optical signal, the second optical signal including the second optical sub-signal.

In still a further embodiment, an optical communications transceiver for use in free space communication includes a plurality of sub-transceivers forming a sub-transceiver array, each one of the plurality of sub-transceivers within the sub-transceiver array being capable of transmitting optical signals at over a range of pointing angles and data rates. The optical communications transceiver also includes a processor configured for controlling transmission settings of optical signals from each one of the plurality of sub-transceivers within the sub-transceiver array. The processor is configured to set the sub-transceiver array to emit an optical signal at an initial pointing angle and an initial data rate. The processor is also configured to modify at least one of the plurality of sub-transceivers in the sub-transceiver array to emit a first optical sub-signal at a first pointing angle having a first offset from the initial pointing angle such that, during a first transmit period, and the sub-transceiver array emits a first optical signal, the first optical signal including the first optical sub-signal. Furthermore, the processor is further configured to modify the at least one of the plurality of sub-transceivers in the sub-transceiver array to emit a second optical sub-signal at a second pointing angle having a second offset from the initial pointing angle, the second offset being smaller than the first offset, such that, during a second transmit period, the sub-transceiver array emits a second optical signal, the second optical signal including the second optical sub-signal.

DETAILED DESCRIPTION OF EMBODIMENTS OF THE INVENTION

Figure 1:
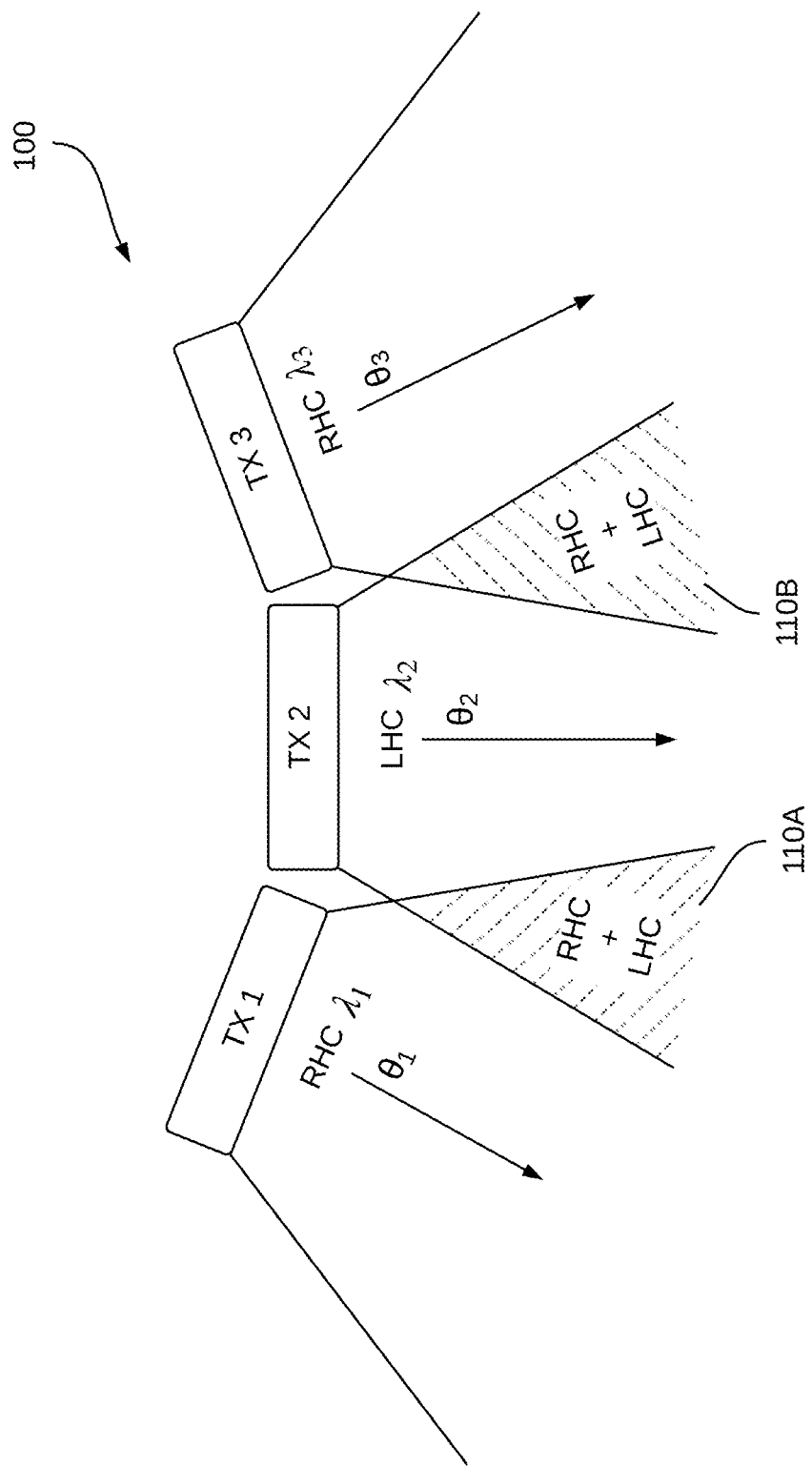
FIG. 1 shows an exemplary MOCA transceiver arrangement, in accordance with an embodiment.

Described herein are techniques and designs for various embodiments of a free space optical communication system. Various embodiments are described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope to those skilled in the art. In the drawings, the size and relative sizes of layers and regions may be exaggerated for clarity. Like numbers refer to like elements throughout.

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Various embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Space-based optical communication systems are poised to take a breakthrough role in commercial satellite missions, as well as inter-satellite links (e.g., links between large GEO and medium earth orbit (MEO) satellites) and space-to-ground links. New technology developments are enabling the migration from traditional RF designs to optical communications to provide a significant leap in the data downlink capabilities even of space and power constrained LEO SmallSats. For instance, optical communications enable small satellites with greater than 1 gigabits per second (Gbps) data links, which is physically impossible with RF systems due to antenna size and power requirements.

An exemplary embodiment of a transceiver with multiple MOCA sub-transceivers is shown in FIG. 1. In some exemplary embodiments, the sub-transceivers are fixedly located on a surface that may be planar or curved. As shown in FIG. 1, optical transceiver 100 is designed with a low profile to allow three sub-transceivers (i.e., sub-transceivers TX1, TX2, and TX3) to be mounted pointing at different angles ($\theta_1$, $\theta_2$, and $\theta_3$, respectively). This configuration allows the overall transceiver to send and receive signals over a larger field of view without mechanically moving the transceiver. In an exemplary embodiment, a desired field of view is covered by $\theta_1$ to ON such that the transceiver does not need to be mechanically translated in order to enable optical communication over the desired field of view. In another exemplary embodiment, only a portion of the desired field of view is covered by $\theta_1$ to $\theta_N$, and a mirror, gimbal, piezoelectric motor, or other mechanical or optical arrangement is used to cover the remainder of the desired field of view by providing a motion that is equal to or greater than $\theta_1$ to $\theta_N$. In other words, by using multiple sub-transceivers, overlapping (partially or completely) outputs, and parallel optical paths, additional functionality is integrated into the overall network operations.

In another exemplary embodiment, each one of sub-transceivers TX1, TX2, and TX3 is configured to send and/or receive signals with different beam parameters. For instance, each one of sub-transceivers TX1, TX2, and TX3 can be configured to transmit optical signals at different frequencies. Consequently, in shaded regions 110A and 110B shown in FIG. 1, where the emissions from TX1 and TX2 as well as TX2 and TX3 respectively overlap, a beat frequency is created in each overlapping region. The beat frequency can be modulated, for example, by adding a phase modulation term at TX2 or TX3. That is, as an example, the modulation of the beat frequency provides an additional modulation term that can be laid into a mixing circuit driving the phase modulator. In this way, the beat frequencies in the shaded regions caused by an interference effect due to the overlap of signals with different frequencies can be used to provide additional modulation control such that essentially an extra data channel can be encoded into the beat frequency signals.

Additionally, in the example illustrated in FIG. 1, each one of sub-transceivers TX1 and TX3 transmits an optical beam having a right-hand circular (RHC) polarization, while sub-transceiver TX2 transmits an optical beam having a left-hand circular (LHC) polarization, such that adjacent sub-transmitters transmit optical beams with orthogonal polarization states. Thus, it is possible to simultaneously transmit from optical transceiver 100 two distinct data streams, which can be separated at the receiver with a polarization sensitive detector/system. Advantageously, if a detector without polarization sensitivity is used, the detector would not be able to distinguish between the two distinct data streams, thus scrambling the transmitted information and potentially providing an additional layer of security from interception of the data streams by unauthorized receivers.

In an alternative embodiment, each one of TX1, TX2, and TX3 is configured to send/receive signals at a different wavelength from each other. For example, TX1 is configured to emit/receive signals at a first wavelength $\lambda_1$, TX2 is configured to emit/receive signals at a second wavelength $\lambda_2$, and TX3 is configured to emit/receive signals at a third wavelength $\lambda_3$. The integration of multiple wavelengths allows implementation of wavelength-division multiplexing (WDM) options where, for instance, multiple data streams can be transmitted and received simultaneously at different wavelengths.

In an exemplary embodiment, a mechanical or non-mechanical means for further steering the pointing direction of TX1, TX2, and TX3 is incorporated. For example, a liquid crystal polymer grating (LCPG) can be used for coarse adjustment of the beam angle, and another device such as a fast steering mirror, electrowetting materials, wedged liquid crystal (LC) cell, or other suitable modulators are used for fine adjustment.

In another embodiment, one or more LCPGs at each sub-transceiver is used to simultaneously combine or separate beams from distinct sub-transceivers. For instance, beams from separate sub-transceivers can be combined using LCPGs to increase the power delivered in a particular direction. Alternatively, specific LCPGs can be used to direct specific beams to different receiving transceivers, thus enabling dynamic networking implementations such as pass through, bent pipe, star networks and other configurations. Further details regarding system adjustments using beam steering and other configurations are described at an appropriate point in the present disclosure hereinafter.

Figure 2:
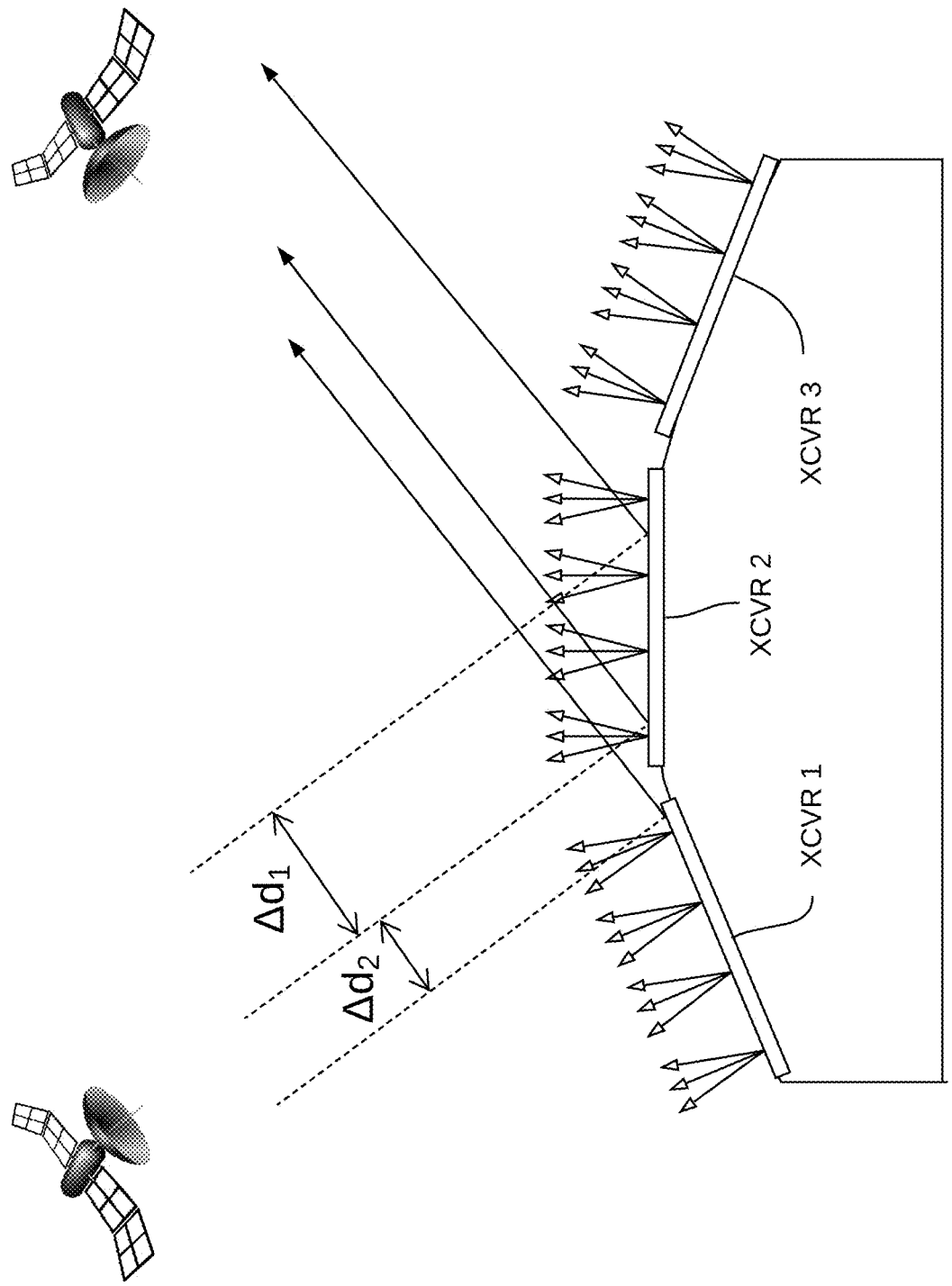
FIG. 2 shows multiple arrays of MOCA sub-transceivers arranged on a curved surface, in accordance with an embodiment

The use of sub-transceiver array configurations also allows the placement of multiple MOCA sub-transceivers on a curved surface, such as the fuselage of an aircraft. An exemplary embodiment is shown in FIG. 2, showing three separate transceivers 210-1 (XCVR1), 210-2 (XCVR2), and 210-3 (XCVR3), each transceiver including multiple sub-transceivers 220, being mounted on different portions of an aircraft fuselage. In fact, rather than just the top of an aircraft or UAV, the transceivers as disclosed herein can be mounted on other locations of an aircraft or UAV, such as on the top, sides, and bottom. The design of the transceivers, as described herein, allow flexibility in mounting the transceivers on various locations of an aircraft or UAV without adversely affecting aerodynamics.

Furthermore, mounting multiple transceivers with sub-transceivers providing overlapping and/or parallel optical paths on various locations on an aircraft or UAV can provide additional functionality. For instance, as shown in FIG. 2, the aircraft can simultaneously communicate with multiple satellites or other communication nodes. Such a configuration allows the links to be established in multiple directions, including in cases when the aircraft is flying along northern (i.e., great circle) routes near the Earth's poles. As an example, transceiver 210-1 is emitting optical signals 225 toward a satellite 230A, while transceiver 210-2 is emitting optical signals 227 toward a satellite 230B.

In initiating transmission to a receiving transceiver, such as a ground station, aircraft (e.g. a UAV or plane), or satellite, as shown in FIG. 2, a group of sub-transceivers of an array of sub-transceivers is designated to transmit optical beams toward the receiving transceiver. Initially, the direction of the optical beams would be determined based upon known or expected locations of the transmitting transceiver and receiving transceiver. The information regarding the known or expected location may be determined based upon global positioning system (GPS) coordinates of one or both of the transmit and receive sides, which may be stored by the transmitting transceiver or communicated with the rest of the possible receiving transceivers in the field of view of the transmitting transceiver. In addition, where the transmitting transceiver and/or receiving transceiver is in motion, e.g., when one or both are an aircraft or satellite, predetermined route or orbital information may be used to determine the initial direction of the optical beams from each sub-transceiver. The transmission angle is then adjusted to improve the throughput and quality of service for the link.

In another embodiment, by altering the functionality of the different sub-transceivers, changes can be made dynamically to the network. For example, different transceivers can be used as a bent pipe, a broadcast source, or independent communications links with different sources. If the power output from several lower power lasers are combined, the need for additional components, such as erbium-doped fiber amplifiers (EDFAs) can be reduced. For instance, Freedom Photonics offers low-cost 0.5 W 1550 nm laser packages, which leads to a lower system cost compared to using EDFAs.

One consideration in the implementation of the transceiver with multiple sub-transceivers is the timing alignment of the signals being transmitted from spatially distinct sub-transceivers. For instance, when a receiving transceiver is not located equidistantly from the array of sub-transceivers, each transmitting a series of optical signal pulses, the signal pulses from each sub-transceiver will not arrive at the receiving transceiver at the receiver simultaneously and can lead to unwanted interference. In a specific example, for a 10 Gbps signal, the relative timing error between different sub-transceivers should be kept below 10 to 15 picoseconds in order to preserve the fidelity of the signal. Since the angle to the target ($\theta$) and the relative offset distance ($x_{spacing}$) of the sub-transceivers is known, a simple calculation is used to determine the relative timing relation between the sub-transceivers:

$$\Delta t_{between apertures} = \frac{x_{spacing}}{c} \sin\theta \quad [\text{Eq. 1}]$$

where $\Delta t$ is the relative timing, D is the relative distance between the sub-transceivers, $\theta$ is the angle to the target (e.g., the satellite shown in FIG. 6), and c is the speed of light. Similarly, the finite size of the aperture ($x_{aperture}$) requires compensation for the varying distances across the aperture to the distant target:

$$\Delta t_{single\_aperture} = \frac{x_{aperture}}{c} \sin\theta \quad [\text{Eq. 2}]$$

Figure 3:
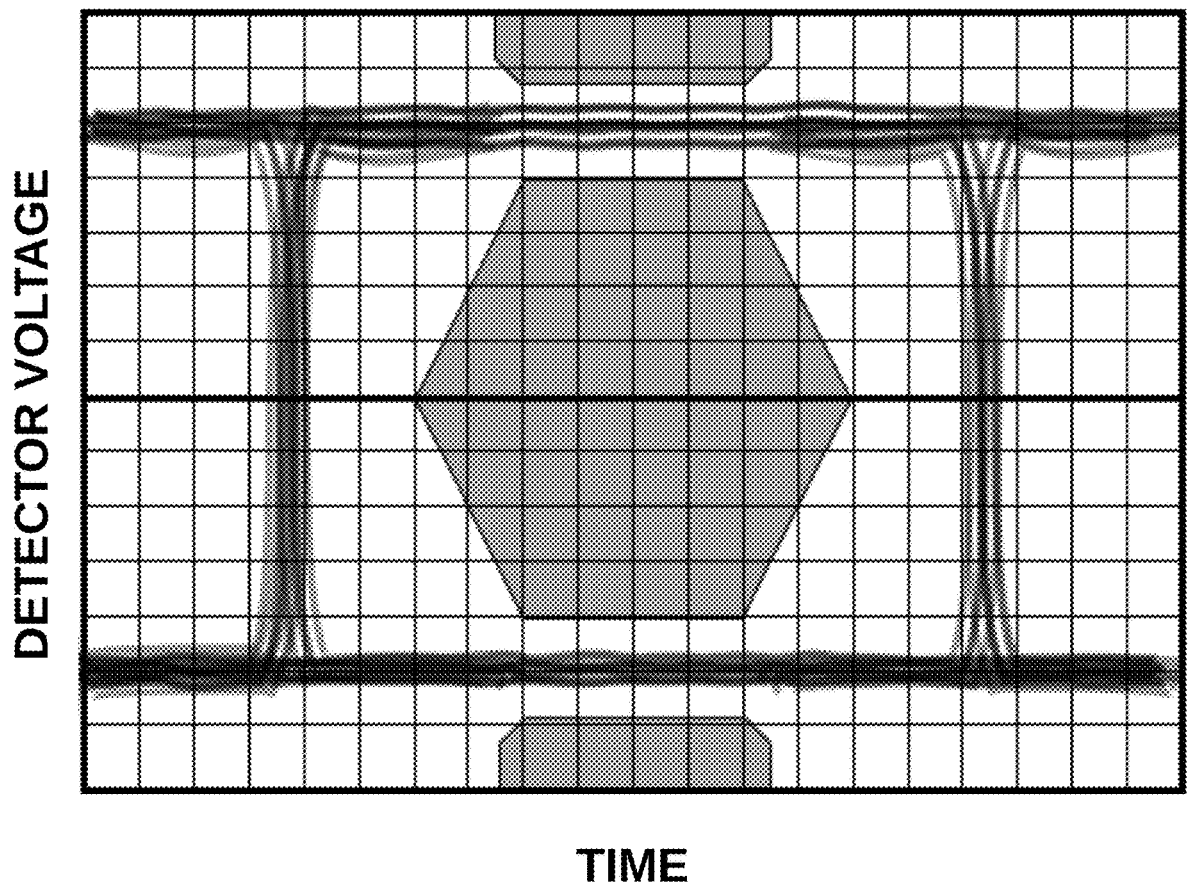
FIG. 3 shows simulated non-return to zero (NRZ) eye diagrams, in accordance with an embodiment

One way to adjust the signal pulses is by using a delay device, such as adaptive optics or delay lines, at the transmitter or the receiver. Alternatively, the time of emission from various sub-transceivers can be proactively or dynamically adjusted in order to account for the curvature of the sub-transceiver array configuration. As shown in FIG. 3, a series of different non-return to zero (NRZ) diagrams illustrate the timing issue with even a 20-picosecond error, which would blur the data together and reduce the chance to transfer data at 10 Gbps. That is, if the emissions from the different sub-transceivers are not appropriately coordinated (as indicated by the signal lines crossing through the "eye" with a 20 picoseconds timing error (i.e., 6 millimeters (mm) in effective distance error)), data transmission becomes impossible. Thus, the effective distance error (see $\Delta d_1$ and $\Delta d_2$ in FIG. 2) from opposing edges of a sub-transceiver array as well as between sub-transceivers must be adjusted to no more than 5 picoseconds (i.e., 1.5 mm in effective distance error) to enable effective transmission of a 10 Gbps data signal. In other words, since even a 20-picosecond timing error can effectively ruin the eye of a 10 Gbps NRZ diagram, the effective distance error between sub-transceivers must be kept below 5 picoseconds worth of distance (i.e., 1.5 mm in effective distance error). Also, while the signal divergence is not as narrow as for an array of sub-transceivers than that of a single, larger diameter aperture transceiver, the eye of the NRZ diagram does close if the sub-transceiver emissions are not appropriately adjusted in accordance with the physical curvature of the surface on which the sub-transceiver array is mounted. While these timing errors depend on the data rate, for signals faster than 10 Gbps, higher resolution adjustment will likely be needed for clear transmission.

Figure 4:
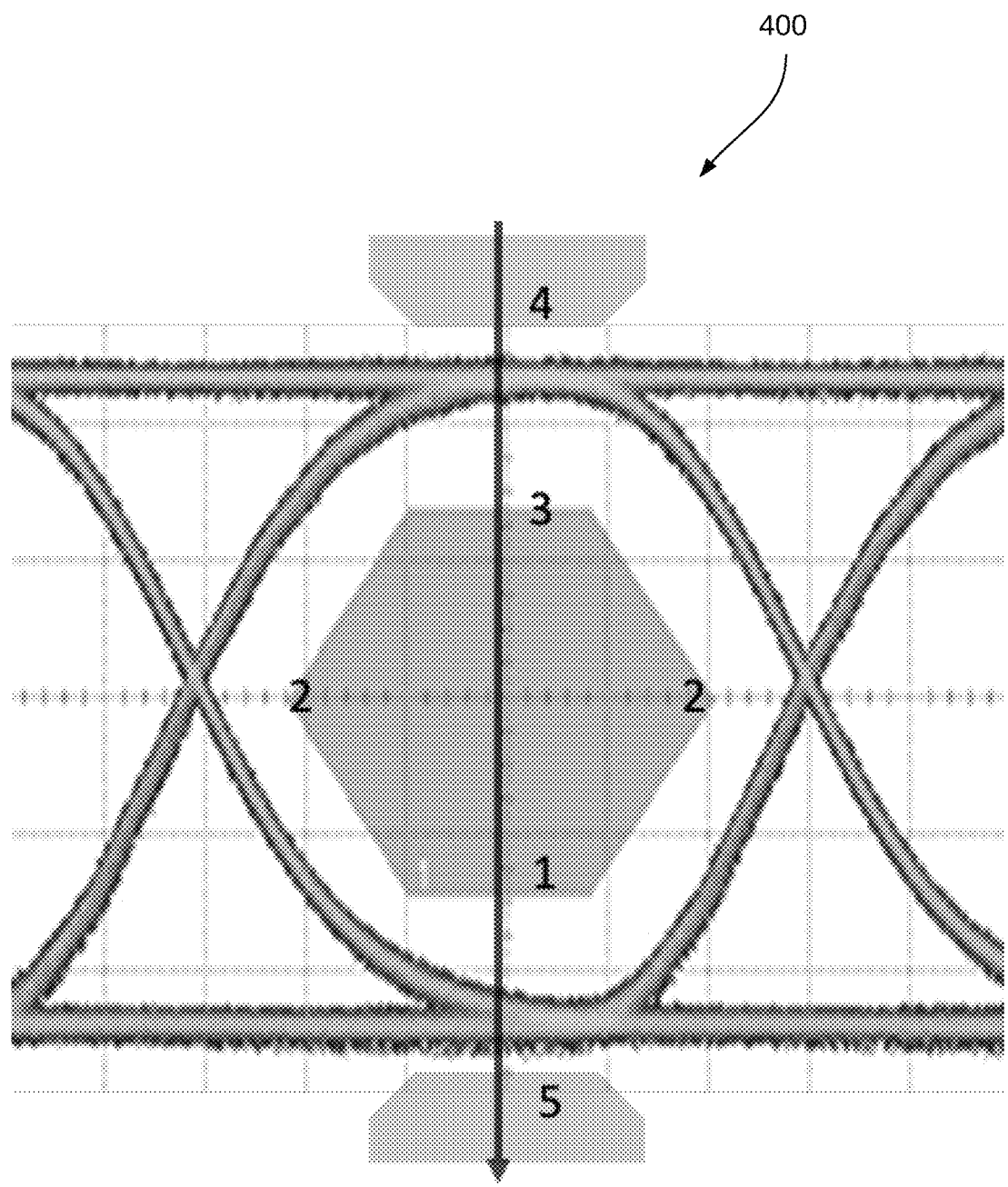
FIG. 4 is a diagram illustrating a portion of a NRZ eye diagram, shown here including a mask that can be used to determine optical signal quality, in accordance with an embodiment.

Referring to FIG. 4, a standard telecommunication mask analysis of an NRZ diagram for identifying specific causes of certain data transmission errors is described. As an example, standard telecommunication masks, such as those outlined by ITU-T and ANSI T1.102, can be used to analyze an NRZ diagram. In the example illustrated in FIG. 4, the mask is defined by the hexagonal shaded area between points 1, 2 and 3 and above and below points 4 and 5, respectively. The shaded areas represent "keep out" areas where, if the electrical signal corresponding to the data transmission impinges in these areas, then there will be possible error in the identity of a "1" bit versus a "0" bit and reduces the Bit Error Rate (BER) of the signal. Such effects may be due to, for instance, transmitter-receiver misalignment, signal attenuation, signal interference, or other problems.

For example, in FIG. 4, the mask edges closest to the horizontal axis indicating the lower bound of the target amplitude are labeled 1 and 5. If the noise of the signal is too large, such that trace becomes large enough to allow the signal to touch the hexagonal inner mask above point 1 or the bottom mask below point 5, then the noise within the signal is likely to be above the decoder thresholds, thus resulting in errors in the data transmission. Impingement of the electrical signals in the mask between points 2 indicate signal jitter or other signal timing problems, which would likely impact the ability to decode adjacent signals in a waveform due to interference between bits. For instance, attenuation from atmospheric dropouts or interference from poorly aligned beams could collapse the detected waveform below point 3. Further, if the automatic gain control (AGC) loop doesn't have proper timing or is subject to interference, the signal can oscillate and stray within the mask into the area below point 3 or above point 4. In addition, there may be further errors and problems with the signal that cause the electrical signal to be observed within the mask, and the above examples are only a subset of the potential errors that the analysis of the mask can capture.

Continuing to refer to FIG. 4, the signal processing and error analysis is performed, for example, using standard digital sampling techniques that use the timing and magnitude of the received signal. In some embodiments, the technique uses a combined signal from all of the receiving sub-transceivers, a subset of the receiving sub-transceivers, or determined individually for each sub-transceiver of the plurality of sub-transceivers, or subset thereof.

Figure 5:
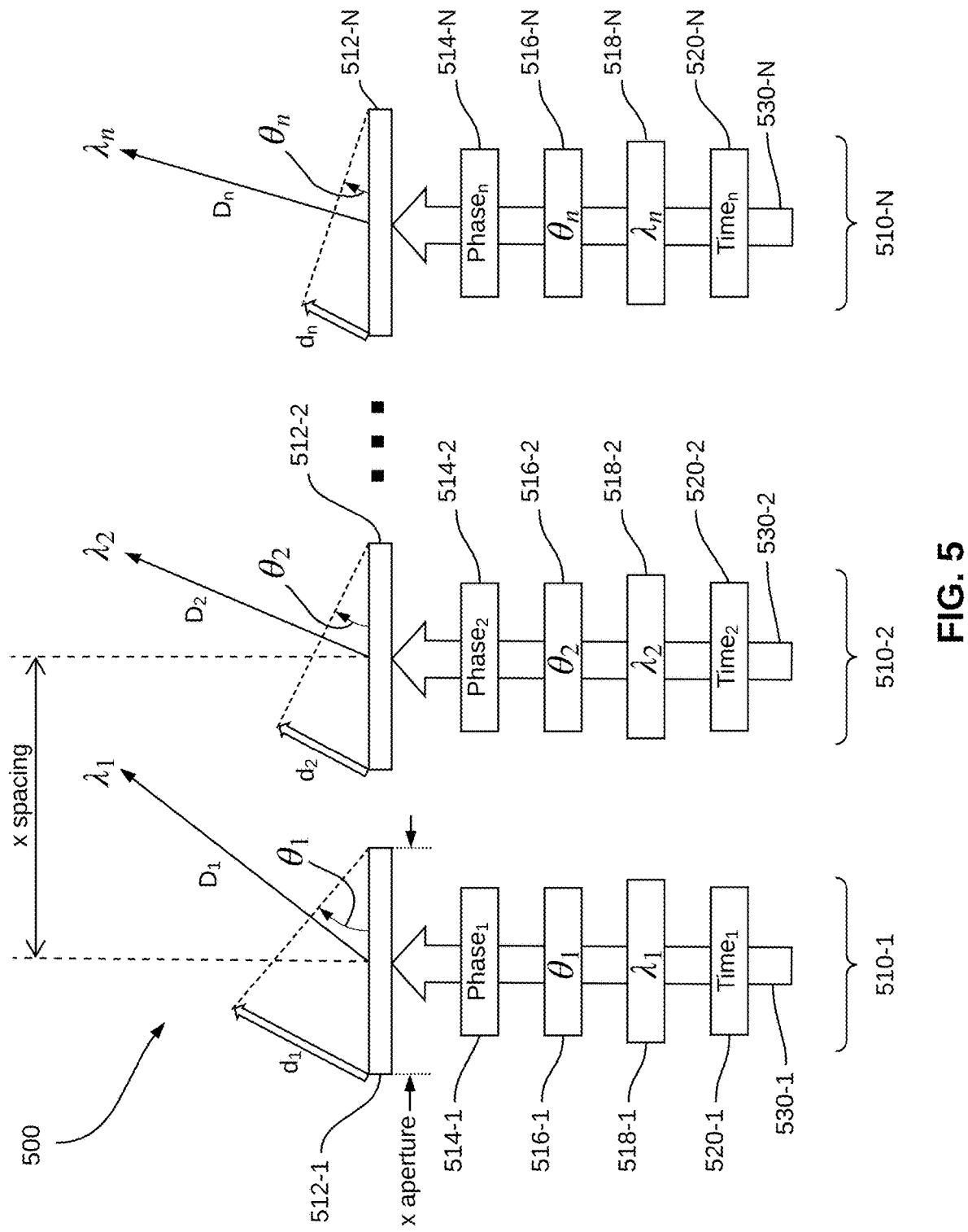
FIG. 5 is a diagram illustrating an exemplary array of MOCA sub-transceivers, in accordance with an embodiment.

Referring now to FIG. 5, an exemplary embodiment of a MOCA transceiver system 500 including a plurality of sub-transceivers 510-1 through 510-N is illustrated. Plurality of sub-transceivers 510-1 through 510-N can be arranged in a linear array, a two-dimensional array, or offset in height to form a three-dimensional array including two or more sub-transceivers. In the example illustrated in FIG. 5, each sub-transceiver 510 includes a sub-transceiver (shown as 512-1, 512-2 . . . 512-N), a phase modulator (shown as 514-1, 514-2 . . . 514-N), an angle modulator (shown as 516-1, 516-2 . . . 516-N), a wavelength modulator (shown as 518-1, 518-2 . . . 518-N), and a timing modulator (shown as 520-1, 520-2 . . . 520-N). Each sub-transceiver includes, for example, one or more of an optical window, an optical filter, a lens system, an aperture stop, and a shutter. Sub-transceivers 512-1 through 512-N can be formed as a single, connected apparatus (e.g., a single large pane of glass, covering an array of opto-electronics components below, or as separate, individual sections. Each phase modulator includes, for example, one or more of a liquid crystal (LC) cell, a lithium niobate (LiNbO3) electro-optic modulator, a piezoelectric modulator, a micro-electromechanical mirror system (MEMs) modulator, a Pockels cell, a polarization modulator, and other electro-optic, mechanical, and thermal modulators. Each angle modulator includes, for example, one or more of a fast-steering mirror modulator, a MEMs modulator, LC switch, and a holographic switch. Each wavelength modulator includes, for example, one or more of an acoustic modulator, a MEMs modulator, and other ways of providing laser wavelength tuning, such as mechanisms for modulating the laser temperature, current, etc.). Each timing modulator includes, for example, one or more of an electronic delay circuit and a programmable circuit (e.g., a field programmable gate array (FPGA), and other mechanisms for modulating the data rate. Additionally, an amplitude modulator (not shown), such as a Mach-Zehnder interferometer, can be included at each or selected sub-transceiver to provide additional signal modulation capability at each sub-transceiver. A light beam (shown as 530-1 through 530-N in FIG. 5) from a light source (not shown), such as a laser, is transmitted through a timing modulator, a wavelength modulator, an angle modulator, a phase modulator, and/or an amplitude modulator, then emitted through a sub-transceiver at each sub-transceiver.

As shown in FIG. 5, each one of sub-transceivers 510 is independently addressable such that each sub-transceiver is configurable to emit at a different optical beam phase, polarization, angle, wavelength, timing, and amplitude (e.g., if an amplitude modulator is incorporated into the system) different from each other sub-transceiver. For instance, as shown in HG 5, transceiver 510-1 is emitting an optical signal at a wavelength $\lambda_1$ at a beam angle $\theta_1$, aimed at a target a distance $D_1$ away. Similarly, transceiver 510-2 is emitting an optical signal at a wavelength $\lambda_2$ at a beam angle $\theta_2$, aimed at a different target (or a different portion of the same target) a distance $D_2$ away. Even if sub-transceiver 510-1 and 510-2 are aimed at the same target, a coarse timing adjustment to account for the small difference in signal timing due to the spatial offset between sub-transceiver 510-1 and 510-2 (indicated by a double-sided arrow labeled $x_{spacing}$) can be accounted for by adjusting one or the other of the signal timing by the following equation:

$$\Delta t = \frac{\Delta d}{c} = \frac{D_2 - D_1}{c} = \frac{x_{spacing}}{c} \sin\theta \qquad [\text{Eq. 3}]$$

where c is the speed of light. For example, if the sub-transceiver array is mounted on a curved surface, optical path length differences across curved surfaces can be compensated, especially for high data rates such as 10 Gbps or higher. Such compensation can be implemented, for instance, by the timing modulator 520 at each sub-transceiver, or by using a delay system following the fiber link at each sub-transceiver. Also, the transmission laser can be split among the different sub-transceivers for transmission, if a high-power laser is used.

In an exemplary embodiment, the outputs from the plurality of sub-transceivers are connected via fiber link to be combined at a single transceiver/modem module to increase the effective surface area and signal-to-noise ratio (SNR). Alternatively, rather than summing the signals from the plurality of sub-transceivers, the signals can be aimed toward separate detectors to create simultaneous and distinct links carrying distinct data streams.

As an example, for an initial transmission to a new target transceiver, sub-transceiver 510-1 can be configured to transmit at an angle $\theta_1$, sub-transceiver 510-2 transmits at an angle $\theta_2$, and so on up to sub-transceiver 510-N transmitting at an angle $\theta_N$ such that $\theta_1 \neq \theta_2 \neq \theta_N$ with each sub-transceiver transmitting an optical signal with different optical characteristics from each other sub-transceiver. At the receiver, an analysis can be performed to determine the optical signal with the strongest reception, thus indicating the sub-transceiver with the optimal transmission characteristics. Alternatively, the offset angle can be calculated for each sub-transceiver by using the mask analysis described with respect to FIG. 4 above, feedback from the target transceiver, such as via beacons received from the target transceiver, a signal-to-noise ratio (SNR) analysis, or other procedures. Consequently, if there is some level of uncertainty or inaccuracy in the a priori information, the variations in the transmission angles from the different sub-transceivers provides a way to determine an optimal transmission angle, and other transmission beam parameters, for all or part of a communication session between the transmitting transceiver and receiving transceiver. The offset angle calculation can be repeated at predetermined intervals during data transmission, or as needed as the quality of service (QOS) drops below a specific threshold due to, for instance, atmospheric conditions and obstructions. For instance, a look-up table can be provided at a processor or controller to select specific offset angles based upon known parameters, such as orbital parameters of the target transceiver, the defined flight path of an aircraft, and meteorological data. Alternatively, QOS parameters, such as SNR, BER, or mask analysis, can be analyzed to adjust the transmission configurations of the sub-transceivers on a running basis.

Figure 6:
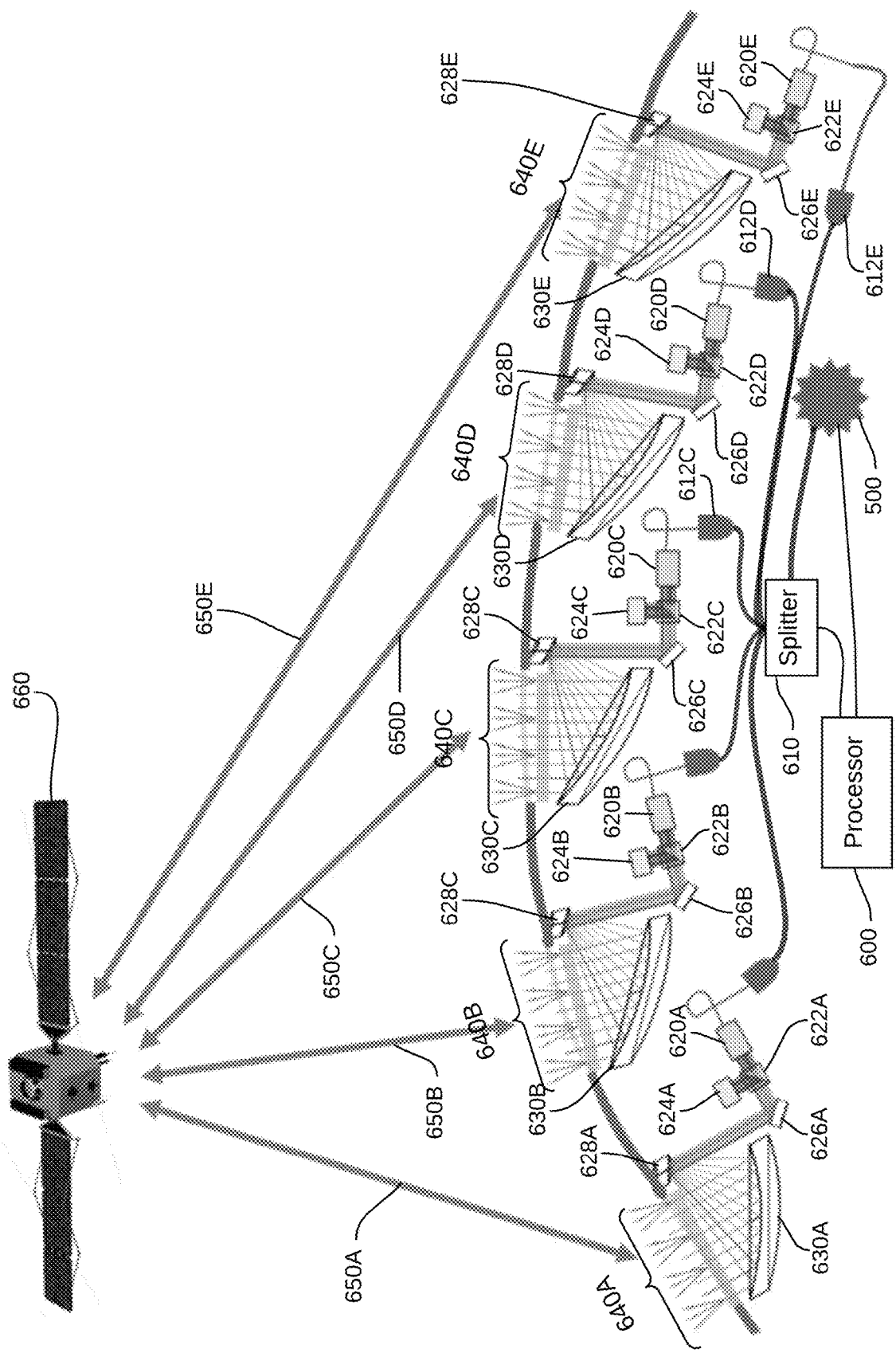
FIG. 6 is a diagram illustrating an exemplary system of multiple arrays of MOCA sub-transceivers, in accordance with an embodiment.

An example of an implementation of multiple MOCA transceivers, each including an array of sub-transceivers, is shown in FIG. 6. FIG. 6 shows transceiver system 500 controlled by a processor 600. Processor 600 also controls a node 610 as well as delay systems 612A—612E. After being processed through each of delay systems 612A—612E, in the example illustrated in FIG. 6, the optical signal emerging from each of transceiver systems 500A—500E is transmitted through a fiber link 620, a beam splitter 622, a position sensitive detector (PSD) 624, reflected from a fast-steering mirror (FSM) 626 and turning mirror 628, and a curved mirror 630 to produce a plurality of rays 640. Each of fiber links 620A through 620E, beam splitters 622A through 622E, PSDs 624A through 624E, FSMs 626A through 626E, turning mirrors 628A through 628E, and curved mirror 630 can be identical to each other or set up with different configurations from each other. Plurality of rays 640A—640E emerging from each of transceiver systems 500A—500E establish separate communication channels 650A—650E, respectively, with a faraway target (shown in FIG. 6 as a satellite 660).

By controlling the variety of components shown in FIG. 6, processor 600 controls each the phase, angle, wavelength, time delay, and amplitude of the plurality of rays 640A—640E. That is, each sub-transceiver within transceiver system 500 is instructed by processor 600 to transmit, or not transmit, an optical beam having a specifically defined wavelength, pulse delay, polarization, timing offset and phase during a given transmit period. This selective approach to improving the specific parameters of the optical signal beam allow high data connections by increasing the data rate and reducing the bit error rate (BER) in a highly granular, dynamic loop.

In many instances, a transmitting transceiver in an optical free space communication system has some a priori knowledge regarding the potential location of one or more receiving transceivers. This a priori information is derived from, for instance, beacons received from the one or more receiving transceivers, based upon known GPS coordinates of one or both of the transmitting transceiver and receiving transceiver, identification of aircraft (e.g., flight numbers), or predetermined route information (e.g., orbital information for satellites, or flight paths) when one or both of the transmitting transceiver or receiving transceiver is in motion. The a priori information is used to determine initial transmission angles, wavelengths, and other transmission parameters from the transmitting transceiver to the receiving transceiver (e.g., satellites in FIG. 2). In another embodiment, the a priori information is used to determine an initial data rate, or the data rate is selected as a lowest or other low data rate that the transmitting transceiver is configured to transmit.

Figure 7:
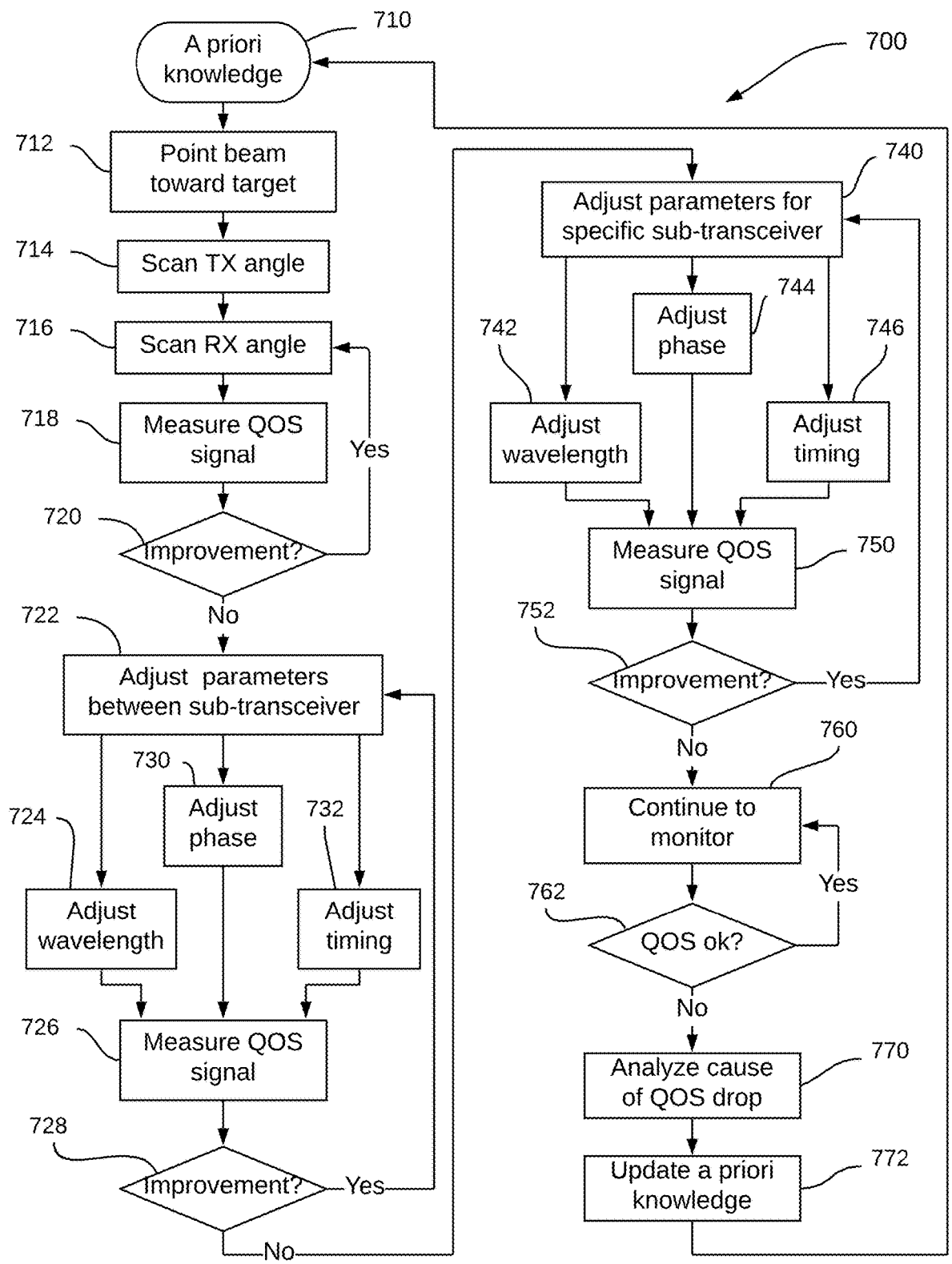
FIG. 7 is a flow chart illustrating a signal acquisition protocol, in accordance with an embodiment.

A specific process for QOS analysis upon initial transmission to a new target transceiver, such as for the MOCA system shown in FIG. 6, is illustrated in FIG. 7. A process 700 begins an input 710 with a priori knowledge about the target receiver, such as previously received beacons from the target receiver, known GPS coordinates of one or both of the transmitting transceiver and target transceiver, identification of the aircraft on which the transmitting or target transceiver is mounted (e.g., flight number, predetermined route information), aircraft flight paths, and satellite orbit information. Additionally, a priori knowledge about the preset optical signal beam angle, phase, wavelength, distance to target transceiver, and other parameters are noted by the processor as well.

In a step 712, optical signal beams from a plurality of sub-transceivers within the transmitting transceiver are directed toward the target transceiver based on the a priori knowledge. The transmitting transceiver is scanned over a preset angular range in a step 714. For example, the transmitting transceiver is spiral scanned over a range of angles until the optical signal strength received at the target transceiver has been maximized. Then, in a step 716, the target transceiver is also scanned over a preset angular range. A QOS signal is measured at the target transceiver in a step 718 to determine whether there has been an improvement in the QOS upon angular modulation of the transmitting or target transceiver. QOS signal measured includes, for example, one or more of a received power, mask analysis (e.g., as discussed with respect to FIG. 4 above), and BER. Upon comparison to a previous QOS signal measurement, a determination is made in a decision 720 to determine if an improvement has been obtained in the QOS compared to the previous measurement. If the answer to decision 720 is YES an improvement was seen over the immediately previous QOS measurement, then process 700 returns to step 716 to see whether further QOS improvement can be attained by further adjustment of the target transceiver pointing angle.

If the answer to decision 720 is NO, the current measurement of the QOS is the same or reduced with respect to the immediately prior measurement, then process 700 proceeds to a step 722, in which optical signal transmission parameter settings between different sub-transceivers within the transmitting transceiver are systematically adjusted. For instance, the wavelength of the optical signal transmitted by the transmitting transceiver can be adjusted by a specific amount in a step 724, the QOS signal measured again in a step 726, and a determination is made in a decision 728 whether a QOS improvement was seen due to the wavelength adjustment. If the answer to decision 728 is YES, a QOS improvement was seen as a result of the wavelength adjustment, then process 700 returns to step 722 for further adjustment of wavelength in step 724, adjustment of the optical signal phase in a step 730, or adjustment of the signal timing in a step 732.

If the answer to decision 728 is NO, a QOS remained the same or degraded as a result of the wavelength, phase, or timing adjustment, then process 700 proceeds to a step 740, in which optical signal transmission parameter settings for one or more specific sub-transceivers within the transmitting transceiver are systematically adjusted. As before, the wavelength, phase, and/or timing of the optical signal transmission are adjusted by a specific amount in a step 742, 744, and 746, respectively. After the adjustment has been made, the QOS is again measured in a step 750, then a determination is made in a decision 752 whether an improvement in the measured QOS was seen as a result of the adjustment. If the answer to decision 752 is YES, a QOS improvement was seen as a result of the wavelength, phase, and/or timing adjustment, then process 700 returns to step 744 for further adjustment of wavelength, phase, and/or timing.

If the answer to decision 752 is NO, a QOS remained the same or degraded as a result of the wavelength, phase, or timing adjustment, then process 700 proceeds to a step 760 to dynamically monitor the QOS periodically. In a decision 762, a determination is made whether the periodically measured QOS is still satisfactory for data transmission. If the answer to decision 762 is YES, the QOS is satisfactory for data transmission, then process 700 returns to step 760. If the answer to decision 762 is NO, the QOS is no longer good enough for data transmission, then process 700 proceeds to a step 770 to analyze the cause of the QOS drop. For example, an analysis of factors, such as too much or too little signal, destructive interference fringes seen at the target transceiver, or the collapse of the eye diagram in the mask analysis, can be noted. If the cause is identified, then the adjusted transmission settings are noted in the processor to update the a priori knowledge in a step 772, and the process returns to the a priori knowledge at input 710 to specifically address the identified cause. If a specific cause cannot be identified, then process 700 can be repeated in an attempt to reestablish acceptable data transmission conditions.

Figure 8:
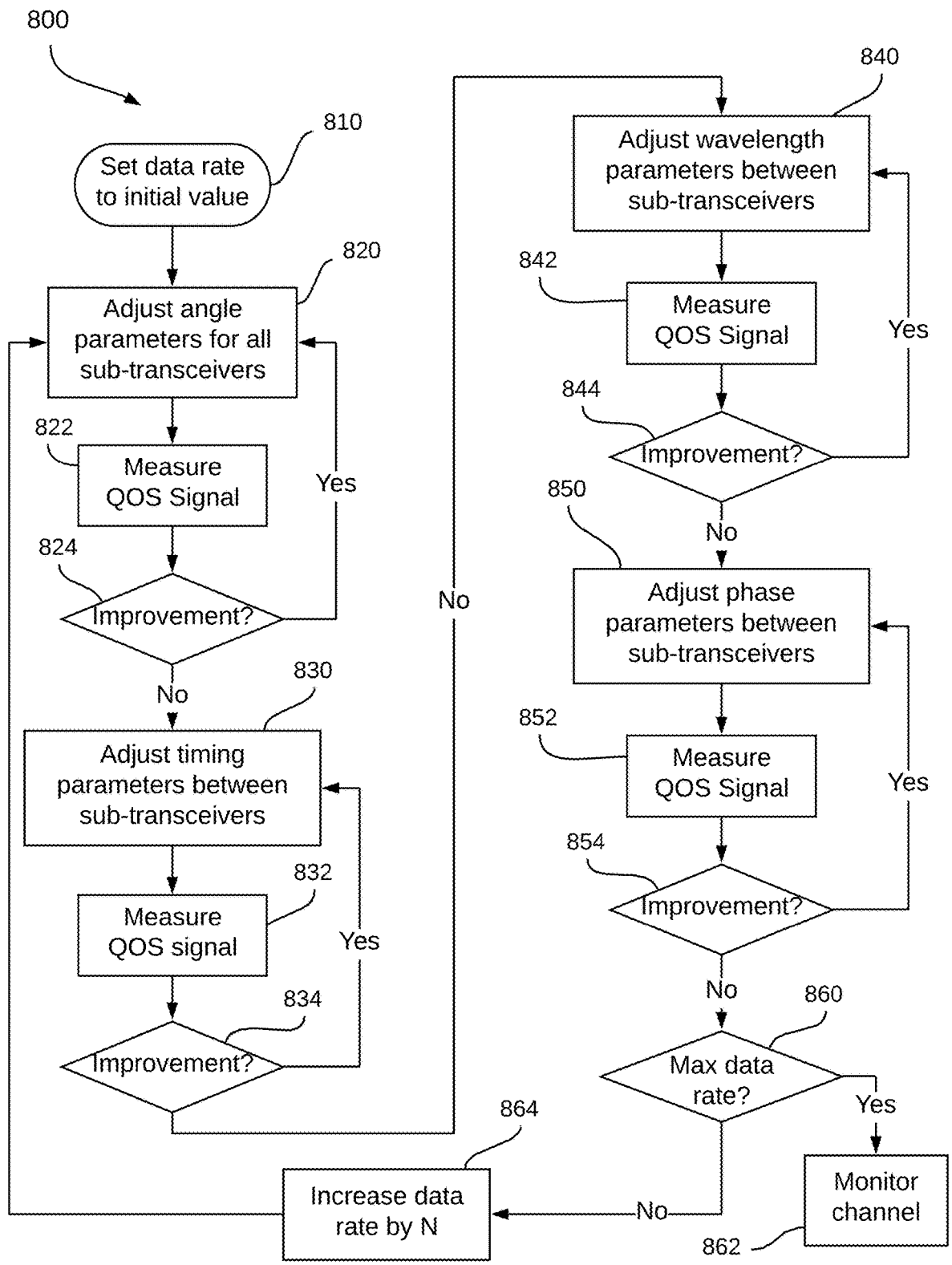
FIG. 8 is a flow chart illustrating a process of quality of service improvement for data rate increase, in accordance with an embodiment.

Referring now to FIG. 8, a process 800 for a more stepwise approach to improving the QOS of a data transmission using a transmitting transceiver with a plurality of MOCA sub-transceivers for communicating with a target transceiver is described. Process 800 begins with an input 810 to set the initial values of the parameters for optical beam transmission, such as transmission angle, wavelength, pulse delay, polarization, timing offset, and phase. In an example, the data rate is set to be less than the maximum data rate theoretically possible for the given type of data transmission, with the expectation that process 800 will help optimize the combination of transmission parameters. Then, in a step 820, the optical beam transmission angle for all sub-transceivers are adjusted by a specified amount. Alternatively, certain subset of the sub-transceivers, such as those known to have the highest SNR, BER, or mask analysis results, can be left unaltered.

After the optical beam is transmitted from all of the transmitting sub-transceivers to the target transceiver, the QOS is analyzed in a step 822. As previously discussed, the analysis of QOS includes, for instance, SNR, BER, and/or mask analysis. For instance, the sub-transceiver having the least noisy "eye-diagram," e.g., that which has the smallest difference in the voltage over some number of sample intervals or that which has the lowest distortion over some number of sample intervals, is selected. In another example, information related to the impingement of the mask or voltage difference across multiple intervals can be provided in feedback messages from the target transceiver, either periodically, upon request from the transmitting transceiver, or when there is a change at a group of sub-transceivers the receiving transceiver below a threshold. For instance, a change in SNR or BER to below a predefined threshold, or when the mask is impinged upon over a single or multiple transmission periods, a request can be sent to the receiving transceiver to send QOS-related information.

Continuing to refer to FIG. 8, a determination is made in a decision 824 whether the QOS has improved as a result of the angle adjustment in step 820. If the answer to decision 824 is YES, an improvement in the QOS was seen after the adjustment in step 820, then process 800 returns to step 820 for further adjustment of the angle parameter for all sub-transceivers in the transmitting transceiver. If the answer to decision 824 is NO, no improvement in the QOS was seen after the angle adjustment or the QOS degraded after the angle adjustment, then process 800 proceeds to a step 830, in which an adjustment is made to the data transmission timing parameters between different sub-transceivers within the transmitting transceiver.

Then, the QOS is measured again in a step 842, and a determination is made in a decision 844 whether the QOS improved following the wavelength adjustment in step 840. If the answer to decision 844 is YES, an improvement in the QOS was detected after the wavelength adjustment, then process 800 returns to step 840 for further adjustment of wavelengths transmitted by different sub-transceivers within the transmitting transceiver. If the answer to decision 844 is NO, no improvement or a degradation in the QOS was seen after the wavelength adjustment, then process 800 proceeds to a step 850 for adjustment of the phase of the transmitted optical beams between the sub-transceivers within the transmitting transceiver.

After the phase adjustment, the QOS is again measured in a step 852, and a determination is made in a decision 854 whether the QOS improved following the phase adjustment. If the answer to decision 854 is YES, an improvement in the QOS was detected after the phase adjustment, then process 800 returns to step 840 for further adjustment of phase of the optical signal beam transmitted from different sub-transceivers within the transmitting transceiver. If the answer to decision 854 is NO, no improvement or a degradation in the QOS was seen after the phase adjustment, then process 800 proceeds to a decision 860 whether the data rate is at a maximum data rate as theoretically calculated given the system constraints. If the answer to decision 860 is YES, the current data rate is the maximum allowed given the system constraints, then the data transmission and QOS are periodically monitored in a step 862 until the link is no longer needed. If the answer to decision 860 is NO, the data rate could still be increased before hitting a theoretical maximum, then the data rate is increased by a predetermined amount (e.g., by N Gbps), and the process returns to step 820 to systematically adjust the transmission parameters once again. In some embodiments the increase in data rate may be by fixed increments, e.g. by a factor of 10, from 100 megabits per second (Mbps) to 1 Gbps to 10 Gbps, or dynamically calculated based upon SNR or BER thresholds that correspond to specific data rates. Further, it should be noted that that in some embodiments the second, third and fourth parameters may be reordered, or less than three parameters may be used.

Although the process described with respect to FIG. 8 stepped through parameter adjustments in the order of angle, timing, wavelength, and phase, other orders and combinations of parameters are contemplated and are considered within the scope of the present disclosure. For instance, as was illustrated in FIG. 7, the order of the parameter adjustment can be, for example, angle, wavelength, phase, then timing for one or more sub-transceivers within the transmitting transceiver.

Figure 9:
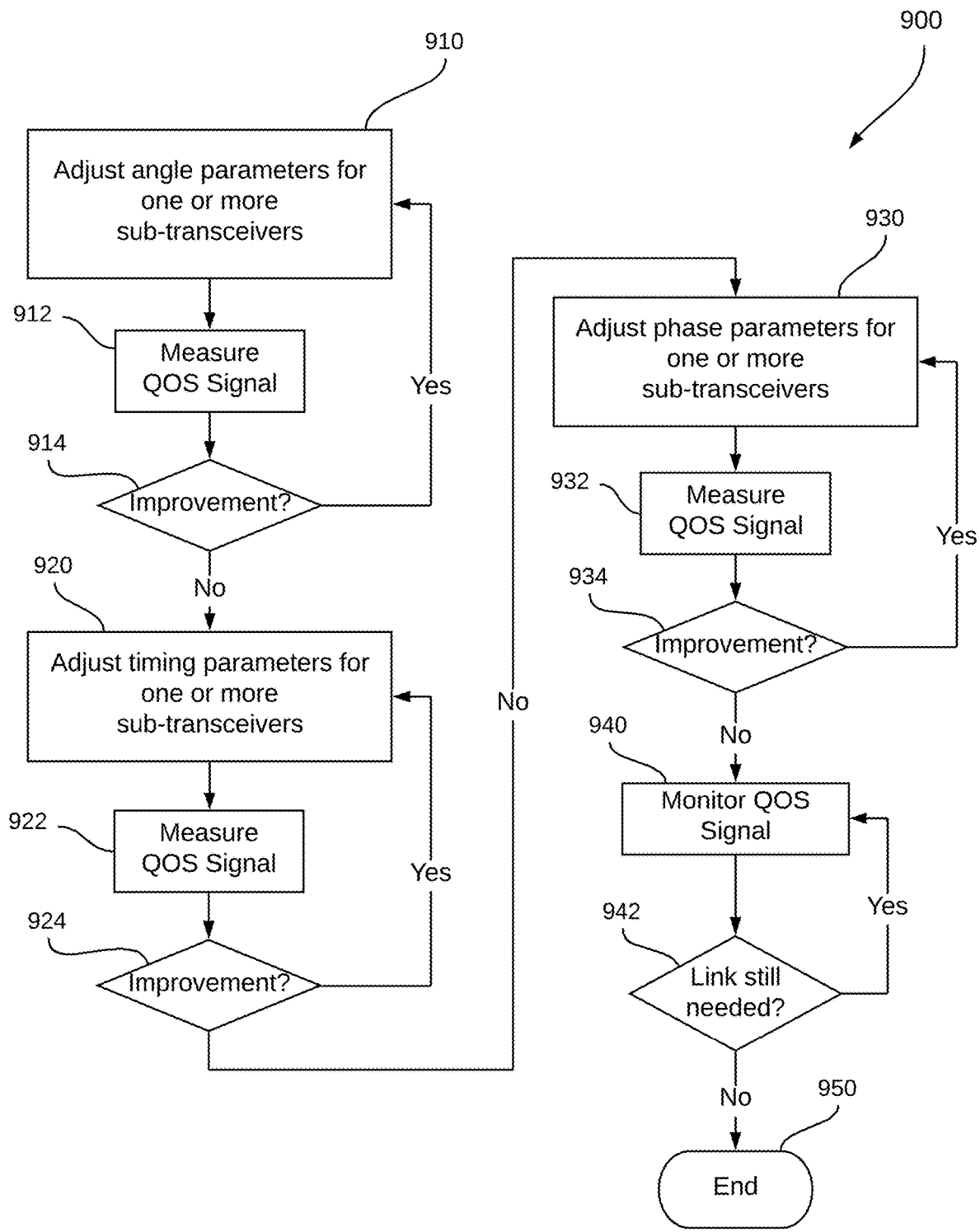
FIG. 9 is a flow chart illustrating a process of quality of service monitoring and improvement, in accordance with an embodiment.

Referring now to FIG. 9, after the data rate has been maximized for the given communication session using process 800, a process 900 can be utilized to further improve the QOS parameters of the communication session with MOCA transceivers. In a step 910, the optical beam transmission angle for one or more specific sub-transceivers (rather than all sub-transceivers en masse) are adjusted by a specified amount. After the angle adjustment, the QOS is again measured in a step 912. A determination is then made in a decision 914 whether the QOS improved following the sub-transceiver specific angle adjustment. If the answer to decision 914 is YES, an improvement in the QOS was detected after the angle adjustment, then process 900 returns to step 910 for further adjustment of the optical beam angle for one or more sub-transceivers within the transmitting transceiver. If the answer to decision 914 is NO, no improvement or a degradation in the QOS was seen after the angle adjustment, then process 900 proceeds to a step 920 to adjust the signal transmission timing for the optical signal from one or more of the sub-transceivers in the transmitting transceiver. After the timing adjustment, the QOS is measured again in a step 922, and a determination is made in a decision 924 whether the QOS improved following the timing adjustment.

If the answer to decision 924 is YES, an improvement in the QOS was detected after the timing adjustment, then process 900 returns to step 920 for further adjustment of timing of the optical signal beam transmitted from one or more sub-transceivers within the transmitting transceiver. If the answer to decision 924 is NO, no improvement or a degradation in the QOS was seen after the phase adjustment, then process 920 proceeds to a step 930 to adjust the phase parameter for one or more sub-transceivers within the transmitting transceiver. Again, after the phase adjustment, the QOS is measured in a step 932, and a determination is made in a decision 934 whether the QOS improved following the phase adjustment. If the answer to decision 934 is YES, an improvement in the QOS was detected after the phase adjustment, then process 900 returns to step 930 for further adjustment of phase of the optical signal beam transmitted from different sub-transceivers within the transmitting transceiver. If the answer to decision 934 is NO, no improvement or a degradation in the QOS was seen after the phase adjustment, then process 900 proceeds to a step 940 to periodically monitor the QOS at predetermined intervals. Then, a decision 942 is made after a certain time interval to determine whether the communication link is still needed. If the answer to decision 942 is YES, the communication link is still needed and the data transmission is still active, then process 900 returns to a step 940 to continue monitoring the QOS. If the answer to decision 942 is NO, the link is no longer needed, then the process is ended in a step 950.

As before, the order and selection of the parameters adjusted can be altered in accordance with specific communication systems. Other transmission parameters, such as pulse delays, angular direction, beam polarization, wavelength, and phase of the one or more sub-transceivers can accomplish a number of objectives, including, but not limited to, increasing the data rate, improving the interference patterns between the transmitted beam from the subset of sub-transceivers, reducing atmospheric attenuation, and a number of other issues. All of these changes can improve the link margin and provide higher data rates for any given receiving transceiver, thus resulting in improved QOS for the overall data transmission.

Referring to FIGS. 7-9, in an embodiment, the optical beams transmitted from each of the transmitting sub-transceiver can be encoded with identifying characteristics particular to that sub-transceiver. For example, each sub-transceiver can be characterized by one or more of a phase, angle, wavelength, timing, or amplitude modulation at a rate that is slower than the data transmission rates. The sub-transceiver can also be identified in its transmission by including optional bits available in a TCP header that identifies the transmitting sub-transceiver. Alternatively, a packet may be inserted into the beam that identifies the transmitting sub-transceiver. Then, where the QOS parameters are included in feedback from the target transceiver, the QOS information for each transmitting sub-transceiver can be extracted from the feedback signal. Furthermore, each of the operations described with respect to FIGS. 7-9 that change the transmission parameters of a specific sub-transceiver can use the feedback information to provide the adjustments based upon the characteristics of that specific sub-transceiver.

In another embodiment, the transmission angle may be changed to form and adjust a predetermined interference pattern between the beams emitted from different sub-transceivers, such as described with reference to FIG. 1. As an example, in the areas where the beams overlap at the receiving transceiver, a beat frequency is created such that the beat frequency can modulated by adding a phase modulation, for instance. In this way, the interference effect can be used to provide additional modulation control such that essentially an extra data channel can be encoded into the beat frequency signal.

The individual improvements of the beam transmission parameters of each sub-transceiver may be done in order to improve the communication session, e.g., providing the highest available data rate, bit-error rate or dealing with atmospheric or physical attenuation. The determination to change one or more beam parameters may be based upon multiple criteria including, but not limited to, a "best" eye-diagram, feedback instructions from the receiving transceiver, SNR, BER, or derived information from beacons that are received from the receiving transceiver. The change may be based upon the transmission parameters of one or more sub-transceivers that have the best channel conditions or throughput, e.g. based upon the eye-diagram, SNR, BER or other parameters.

Figure 10:
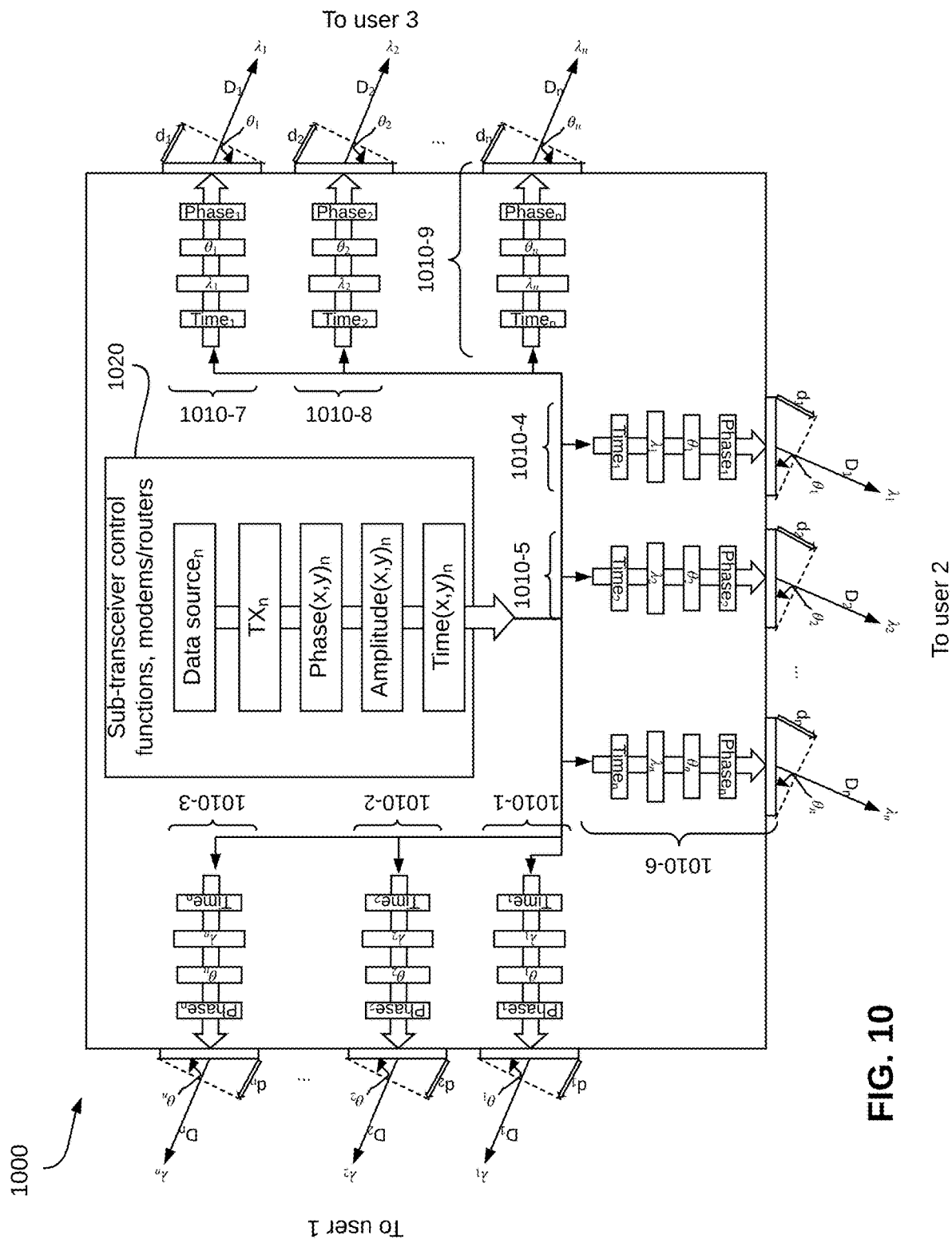
FIG. 10 is a diagram of a group of MOCA sub-transceivers of a sub-transceiver array, in accordance with an embodiment.

Referring now to FIG. 10, multiple arrays of MOCA transceivers can be mounted in different, non-overlapping directions to produce a higher-level communication node with routers and modems to either pass through a data stream or broadcast a single input into multiple outgoing links to other nodes. As shown in FIG. 10, a system 1000 includes several MOCA transceivers directed at users located in disparate directions. In the example shown in FIG. 10, transceivers 1010-1, 1010-2, and 1010-3 are directed toward user 1, transceivers 1010-4, 1010-5, and 1010-6 are directed toward user 2, and transceivers 1010-7, 1010-8, and 1010-9 are directed toward user 3. The transceivers are controlled by a central control 1020, which includes components such as sub-transceiver control functions, modems, and routers for controlling the various data sources, transceiver configurations, as well as parameters related to the phase, amplitude, and time at each of the transceivers.

Many different embodiments stem from the above description and the drawings. It will be understood that it would be unduly repetitious and obfuscating to describe and illustrate every combination and subcombination of these embodiments. As such, the present description, including the drawings, shall be construed to constitute a complete written description of all combinations and subcombinations of the embodiments described herein, and of the manner and process of making and using them, and shall support claims to any such combination or sub combination.

For instance, while the various embodiments above have been described as transceivers, each transceiver can also be configured to function solely as a transmitter or a receiver, not both. Such specialized transmitter or receiver systems can be less costly than dual-use transmitter systems. As another example, rough adjustment of the pointing angles of the multiple sub-transceivers can be performed using a switching mechanism, such as a liquid crystal polymer grating, while fine adjustment can be performed using a finer mechanism, such as fast steering mirrors. Alternative mechanisms for providing such angular adjustment are, and not limited to, retro-reflectors with a back-facet modulator, two-dimensional implementations such as the liquid crystal modulators available from Vescent Photonics, MEMS modulators, electro-wetting materials from University of Colorado at Boulder, and acousto-optic modulators, each of which may be used for either coarse or fine adjustment.

As another example, the optical signal can simultaneously contain two or more polarization states, each polarization state carrying a stream of data. Each of the multiple sub-transceivers can be configured to receive one of the two or more polarization states, while ignoring optical signals with other polarization states, such that the optical signals with different polarization states are separately detected at different sub-transceivers. For instance, the optical signal can contain multiple polarization states such that the different polarization states are detected by different sub-transceivers. The optical signals of different polarization states can then be compared using a comparative mechanism. The comparison can be used, for example, to verify the authenticity of a given optical signal. As an example, if the optical signal is found to contain a specific polarization state, which should not have been included in an authentic signal, then that optical signal can be discarded as faulty. Alternatively, if the comparison between the optical signals with different polarization states shows the polarization states are not following a known pattern, then that optical signal can again be discarded as faulty. In other words, the optical communications transceiver, in an embodiment, can include first and second sub-transceivers configured for receiving optical signals containing first and second polarization states, respectively. The transceiver can further include a comparative mechanism for comparing the optical signal received at the first and second sub-transceivers for, as an example, verifying the authenticity of the optical signal received by encoding an additional channel of data onto the comparison signal between the sub-transceivers. Additionally, with a priori knowledge of the physical arrangement of the transmitting transceiver sending the data as well as the encoding of the comparison signal, the receiving transceiver can verify the authenticity of the received optical signal to avoid being spoofed by a false transmitting transceiver. For instance, the authenticity of the received optical signal can be ensured by encoding an additional channel of data onto a comparison signal between sub-transceivers as an authenticity "fingerprint."

As still another example, the number of sub-transceivers modulated within the sub-transceiver array is dynamically adjustable during any given transmit period. For example, during a first transmit period, the transmission characteristics (e.g., power, direction, phase, polarization, timing) of at least one of the sub-transceivers in the sub-transceiver array is modified with respect to other sub-transceivers in the array. Then, during a second transmit period, the transmission characteristics of the at least one or another group of sub-transceivers can be modified. That is, the overall transmission characteristics of the transceiver can be dynamically adjusted over time as needed by modifying the transmission characteristics at the sub-transceiver level.

The embodiments described herein are also applicable for aeronautical use, such as satellite-to-plane, plane-to-plane, plane-to-ground, air-to-underwater and space-to-underwater communications, as well as communications between underwater locations. In addition to airplanes, other aerial, terrestrial, and nautical moving objects include, but are not limited to, balloons, aerostats, dirigibles, unmanned aerial vehicles (UAVs), cars, trucks, ships, submarines, missiles, and rockets. Additionally, terrestrial applications, such as automotive, person-to-person or person-to-satellite communications are also contemplated. For instance, the embodiments described herein can be used to set up ad hoc networks between a user and nearby ground stations, or even for commercial purposes such as for directing communications at pedestrians with specialized equipment (e.g., wearable transceivers) and sending advertising information to installed electronic signs or even light posts. Furthermore, rather than a curved arrangement of multiple sub-transceivers, the sub-transceivers can be arranged in a flat configuration with the same orientation angle, akin to a solar panel, and installed on flat surfaces, such as on stealth planes or other flat surfaces. Although only a few exemplary embodiments have been described, those skilled in the art will readily appreciate that many modifications are possible in the exemplary embodiments without materially departing from the teachings and advantages of the described embodiments.

Furthermore, the present embodiments provide the ability to dynamically add or remove distortion to widen the beam or create several beams (e.g., multi-spots) and then scan these "distorted" profiles to cover more area or to improve throughput, SNR, BER and other beam parameters of any of the individual beams. This functionality allows the system to quickly acquire a target terminal and maintain a link while the sub-transceiver array is configured to provide higher data transfer rates, BER, SNR, and eye diagrams with reduced mask impingement or other beam parameters.

In the description, there have been disclosed embodiments and, although specific terms are employed, they are used in a generic and descriptive sense only and not for purposes of limitation. Although a few exemplary embodiments have been described, those skilled in the art will readily appreciate that many modifications are possible in the exemplary embodiments without materially departing from the teachings and advantages of each embodiment or their combination. Accordingly, all such modifications are intended to be included within the scope of the embodiments as defined in the claims. Therefore, it is to be understood that the foregoing is illustrative and is not to be construed as limited to the specific embodiments disclosed, and that modifications to the disclosed embodiments, as well as other embodiments, are intended to be included within the scope of the appended claims.

That which is claimed:

1. A method for initiating communication from an optical communications transceiver for use in free space communication, the optical communication transceiver including a plurality of sub-transceivers forming a sub-transceiver array, each one of the plurality of sub-transceivers within the sub-transceiver array being capable of transmitting optical signals at over a range of pointing angles and data rates, the method comprising:

setting the sub-transceiver array to emit an optical signal at an initial pointing angle;

modifying at least one of the plurality of sub-transceivers in the sub-transceiver array to emit a first optical sub-signal at a first pointing angle having a first offset from the initial pointing angle;

during a first transmit period, transmitting to a receiving transceiver from the sub-transceiver array a first optical signal, the first optical signal including the first optical sub-signal, at a first data rate;

further modifying the at least one of the plurality of sub-transceivers in the sub-transceiver array to emit a second optical sub-signal at a second pointing angle having a second offset from the initial pointing angle, the second offset being smaller than the first offset;

in a second transmit period, following the first transmit period, transmitting to the receiving transceiver from the sub-transceiver array a second optical signal, the second optical signal including the second optical sub-signal; and the receiving transceiver being mounted upon an aircraft, wherein further modifying the at least one of the plurality of sub-transceivers includes specifying the second pointing angle based on known trajectory of the aircraft.

2. The method of claim 1, wherein the second optical signal is transmitted to the receiving transceiver at a second data rate, the second data rate being different from the first data rate.

3. The method of claim 1, wherein the initial pointing angle of the sub-transceiver array is determined based upon a priori knowledge of positioning data of the receiving transceiver and the optical communications transceiver.

4. The method of claim 1, further comprising, in a subsequent transmit period, further modifying a subsequent pointing angle such that a subsequent offset from the initial pointing angle of the sub-transceiver array is less than the second offset.

5. The method of claim 1, further comprising, in a subsequent transmit period, adjusting at least one of wavelength, pulse delay, polarization, and phase of the at least one of the plurality of sub-transceivers in the sub-transceiver array with respect to at least another sub-transceiver in the sub-transceiver array.

6. The method of claim 5, wherein adjusting includes
analyzing an eye diagram mask and signal-to-ratio noise across the sub-transceiver array, and
determining a degree of adjustment to be made to at least one of wavelength, pulse delay, polarization, and phase of the at least one of the plurality of sub-transceivers in the sub-transceiver array.

7. A method for initiating communication from an optical communications transceiver for use in free space communication, the optical communication transceiver including a plurality of sub-transceivers forming a sub-transceiver array, each one of the plurality of sub-transceivers within the sub-transceiver array being capable of transmitting optical signals over a range of pointing angles, wavelengths, pulse delays, polarizations, timing offsets, phases, and data rates, the method comprising:

setting the sub-transceiver array to emit an optical signal at an initial setting for pointing angle, wavelength, pulse delay, polarization, timing offset, phase, and data rate, modifying at least one of the plurality of sub-transceivers in the sub-transceiver array to emit a first optical sub-signal at a first setting for pointing angle, wavelength, pulse delay, polarization, timing offset, phase, and data rate, the first setting being different from the initial setting, during a first transmit period, transmitting to a receiving transceiver a first optical signal, the first optical signal including the first optical sub-signal, the receiving transceiver being mounted on an aircraft;

further modifying the at least one of the plurality of sub-transceivers in the sub-transceiver array to emit a second optical sub-signal at a second setting for pointing angle, wavelength, pulse delay, polarization, timing offset, phase, and data rate, the second setting being different from the first setting;

in a second transmit period, transmitting to the receiving transceiver a second optical signal, the second optical signal including the second optical sub-signal; and wherein further modifying the at least one of the plurality of sub-transceivers includes specifying the second setting based on known trajectory of the aircraft.

8. The method of claim 7, wherein further modifying the at least one of the plurality of sub-transceivers includes specifying the second setting so as to create a specified interference pattern at the receiving transceiver.

9. The method of claim 7, wherein further modifying the at least one of the plurality of sub-transceivers includes specifying the second setting based on feedback from the receiving transceiver.

10. An optical communications transceiver for use in free space communication, the optical communications transceiver comprising:

a plurality of sub-transceivers forming a sub-transceiver array, each one of the plurality of sub-transceivers within the sub-transceiver array being capable of transmitting optical signals at over a range of pointing angles and data rates toward a receiving transceiver mounted on an aircraft; and a processor configured for controlling transmission settings of optical signals from each one of the plurality of sub-transceivers within the sub-transceiver array, wherein the processor is configured to set the sub-transceiver array to emit an optical signal at an initial pointing angle and an initial data rate, wherein the processor is configured to modify at least one of the plurality of sub-transceivers in the sub-transceiver array to emit a first optical sub-signal at a first pointing angle having a first offset from the initial pointing angle such that, during a first transmit period, and the sub-transceiver array emits a first optical signal, the first optical signal including the first optical sub-signal, wherein the processor is further configured to modify the at least one of the plurality of sub-transceivers in the sub-transceiver array to emit a second optical sub-signal at a second pointing angle having a second offset from the initial pointing angle, the second offset being smaller than the first offset, such that, during a second transmit period, the sub-transceiver array emits a second optical signal, the second optical signal including the second optical sub-signal, and wherein the processor modifies the at least one of the plurality of sub-transceivers in the sub-transceiver array based on known trajectory of the aircraft.

11. The optical communications transceiver of claim 10, each one of the plurality of sub-transceivers being also capable of transmitting optical signals over a range of wavelengths, pulse delays, polarizations, timing offsets, and phases in addition to pointing angles and data rates,
  wherein the processor is still further configured to modify the at least one of the plurality of sub-transceivers in the sub-transceiver array to emit the first optical sub-signal at a first setting for pulse delay, polarization, timing offset, phase, and data rate, and
  wherein the processor is yet further configured to modify the at least one of the plurality of sub-transceivers in the sub-transceiver array to emit the second optical sub-signal at a second setting for pulse delay, polarization, timing offset, phase, and data rate, the second setting being different from the first setting.

\* \* \* \* \*